Patented May 12, 1953

2,638,445

UNITED STATES PATENT OFFICE 2,638,445

SULFONATED HIGH MOLECULAR WEIGHT STYRENE-OLEFIN COPOLYMERS

David W. Young, Roselle, William H. Smyers, Westfield, and William J. Sparks, Cranford, N. J., assignors to Standard Oil Development Company, a corporation of Delaware No Drawing. Application May 5, 1945, Serial No. 592,274

13 Claims. (Cl. 252—33)

This invention relates to novel, chemically modified high molecular weight synthetic copolymers, and to methods of preparing and using same, and more particularly, it relates to the preparation of modified resins and derivatives of copolymers by reacting them with polybasic acids such as sulfuric acids, phosphoric acids etc., especially for the production of emulsifying agents, detergents etc. The invention may be illustrated by the reaction of strong or fuming sulfuric acids with a high molecular weight styrene-isobutylene copolymer to produce corresponding mildly or extensively sulfonated derivatives useful as modified resins or as emulsifying agents etc.

Copolymers of styrene and isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C. such as —10° C., —50° C., —80° C., —100° C., or even lower, in the presence of an active metal halide polymerization catalyst, and preferably in the presence of an inert, volatile organic liquid serving as solvent and refrigerant.

Instead of styrene, other polymerizable cyclic material may be used such as alphamethyl styrene, alpha ethyl styrene, paramethyl styrene, alphamethyl paramethyl styrene, p-chlorostyrene, p-bromostyrene, dihydronaphthalene, indene, terpenes, coumarone, para methoxy styrene, etc., as well as copolymers of indene and coumarone etc.

Instead of isobutylene, other iso-olefins may be used such as isoamylene, particularly methyl-2 butene-2, isooctylene etc., as well as other aliphatic olefins such as ethylene, propylene, normal butylene, octene-1, decene-1, and octadecene-1 etc.

The proportions in which the styrene or other polymerizable cyclic material and the isobutylene or other aliphatic olefin material may be copolymerized may vary over a wide range from 1% to 30%, 50% or 90% or even 99% of the polymerizable cyclic constituent. In fact, an even smaller amount of such cyclic material may be used such as even 0.1% or less, it being sufficient to merely have 1 or 2 molecules of the styrene or other polymerizable cyclic material combined into a relatively long chain of isobutylene or other aliphatic olefin, the aromatic nucleus of the styrene serving as a chemical handle by which the high molecular weight resultant copolymer may be subjected to the subsequent chemical reaction according to the present invention.

For convenience and brevity, the above described copolymer of a cyclic polymerizable material and an olefin will be referred to as a cycalkene copolymer. The specific type of copolymer made from styrene and isobutylene will similarly be referred to for brevity as stybutene. The invention will be illustrated as applied particularly to stybutene, although it is not to be limited thereto.

The copolymer to be used may also be a tripolymer of a polymerizable cyclic compound, an olefinic compound and a small amount, between 0.1–30% or so, preferably 0.5% to 10% of a diolefin or other polyene, e. g., butadiene, isoprene, 2-3 dimethyl butadiene, myrcene etc. One example of such a tripolymer is one comprising about 50% of isobutylene, 47% of styrene and 3% of isoprene, in the combined state. One other example of such a tripolymer is one comprising about 50% isobutylene, 45% alphamethyl styrene and 5% cyclopentadiene. One other example of such a tripolymer is one comprising about 10% butadiene and 80% isobutylene, and about 10% p-chlorostyrene.

Still further copolymers may be used such as those made by copolymerizing a diolefin such as butadiene, isoprene, etc. or other polyolefins, with a polymerizable cyclic compound which after copolymerization, will still contain a reactive cyclic nucleus such as the benzene ring in a styrene group, as for instance, copolymers of alphamethyl styrene with butadiene or styrene and isoprene. It is preferred, for the purposes of the present invention, to use copolymers having only moderate, little, or no unsaturation, i. e., an iodine number of less than about 100, and preferably less than 50, in many cases the best results being obtained with copolymers having an iodine number less than 10. However, to obtain a special structure in the copolymer of a styrene and polyene, it may be hydrogenated to any given iodine number before the sulfonation or other chemical treatment of this invention.

Heretofore, emulsifying agents, disinfectants and wetting agents have been made from a wide variety of raw materials; however it has been difficult or impossible, to make any of such agents having long, relatively aliphatic hydrocarbon chain groups having a molecular weight for instance, of over 2,000, and particularly over 10,000 or 50,000. The present invention offers for the first time a means of making emulsifying and wetting agents etc. containing such groups, and the resulting products are found to have very unexpected properties owing to their novel chemical structure and to their intrinsic viscosity which is at least 0.5. However, the present invention also covers the chemical treatment i. e., sulfonation etc. of low molecular weight copolymers e. g., of isobutylene and styrene such as in the dimer and trimer, tetramer, etc. molecular weight range of isobutylene-styrene copolymers.

With milder reaction conditions this invention also provides a very wide variety of modified plastics containing polar groups, e. g., sulfonate, phosphate, etc. which modify their surface texture, adhesiveness and other important properties.

Broadly, the invention comprises reacting such copolymers as described hereinabove, either singly or in admixtures of two or more types, with a treating agent selected from the group consisting of acid-reacting compounds of an element capable of forming polybasic inorganic acids, and halogen-, organic-, and other substituted derivatives thereof, including acids of sulfur, phosphorus, arsenic, boron and the like, such as sulfuric acid, nitrosylsulfuric acid, fuming sulfuric acid, sulfur trioxide, phosphoric acid, or sulfur pentoxy dichloride, sulfuryl thiocyanate [$SO_2(SCN)_2$]$_x$, phosphorus pentoxide, a reagent made by dissolving phosphorus pentoxide in strong sulfuric acid, phosphorus halides such as phophorus oxychloride, or -oxybromide, or -oxybromchloride, and phosphorus trichloride, either alone or with a catalyst such as $AlCl_3$, Mg powder or using instead of the copolymer a Grignard reagent RMgX made by halogenating the copolymer and reacting with Mg powder to make phosphonic and phosphinic derivatives, or other acids such as chlorsulfonic acid, fluorsulfonic acid, and weaker acids such as sulfurous acid, sulfur dioxide, phosphorous acid, etc. may be used provided more stringent reaction conditions are used than are required with the stronger acids.

Organic-substituted acids include alkyl, aryl, alkaryl, aralkyl, cycloalkyl, alkoxy, etc. derivatives of these various acids where such an organic group replaces a hydroxyl group, oxygen, or a hydroxyl hydrogen atom as in methane sulfonic acid, amyl phosphoric acid, dibutyl phosphoric acid, isopropyl sulfuric acid, etc.

A wide variety of different types of products can be obtained, not only by the use of various amounts of acid, and various concentrations of acid (as by the use of sulfuric acid of 65%, 95%, or 120% strength), but also by starting with copolymers having the desired combination of physical and chemical properties which may be adjusted both by control of the proportions of styrene and isobutylene for instance, and also by the temperature of the copolymerization (copolymers being made at very low temperatures such as $-125°$ C. or $-103°$ C. being of much higher molecular weight and tougher or plastic physical properties and intrinsic viscosity of at least 0.5, while those made at more moderate temperatures such as $-30°$ C. and $-25°$ C. being of lower molecular weight).

The reaction may be carried out in the presence of an inert solvent such as refined petroleum naphtha or kerosene, etc. or chlorinated solvents such as ethylene dichloride, tetrachlorethane, $CCl_4$, nitromethane, white oils, etc. The reaction temperature should be about $-50°$ C. to $200°$ C., preferably about $-25°$ C. to $130°$ C., or $0°$ to $150°$ C., depending upon the strength of acid, amount of solvent, etc. The reaction may be carried out under vacuum or at atmospheric pressure or at various higher pressures such as 2, 10, etc. atmospheres or higher.

The resultant copolymer salts, e. g. sulfates, sulfonates, phosphates, etc., may be made and used with either one or more of the hydrogen atoms or hydroxyl groups of the acid replaced by the organic copolymer radical. For instance, a "stybutene" (styrene-isobutylene copolymer) may be reacted with sulfuric acid to produce a di-stybutene sulfate ester or a mono-stybutene acid sulfate, which in turn may be used either in the acid condition or in the form of a corresponding metal salt such as the sodium, potassium, lithium, barium, calcium, magnesium, aluminum, tin, copper, cobalt, lead, or other metal salt, ammonium and amine salt, or the salt of onium bases such as tetramethyl ammonium hydroxide etc.

The novel products of this invention may also be converted by chemical reaction into other derivatives. For instance, a high molecular weight copolymer sulfonyl chloride, such as a stybutene sulfonyl chloride, may be reacted with ammonium to form the corresponding copolymer sulfonamide.

Triphenylarsine and tri-o-tolylarsine may be condensed with $N^1$-potassiochloro-$N^4$-acetyl sulfanilamide stybutene to yield the corresponding hydrated arsenimines, while tri-p-tolylarsine yields the unhydrated type of arsinimine; also the stybutene sulfonate may be condensed with chlorinated or other halogenated wax by the use of active catalysts to formulate wax-stybutene sulfonates. The sulfonated stybutene may also be alkylated with amyl chloride, amylene or other alkyl halides or olefines.

The texture, solubility, melting point and other properties of the sulfonated or other copolymer derivatives or modified copolymers described above, may vary widely, according to the raw material treated, the treating agent and the stringency of the reaction conditions, the product sometimes being a liquid having an oily or viscous consistency, or a solid which may have waxy, plastic, or resinous texture. A very great advantage of the present invention is that it provides a readily controllable method of making resins and other plastics, emulsifying agents, wetting agents, dispersing agents, disinfectants, etc. having practically any desired solubility or compatibility with aqueous, alcoholic, or other organic solvents, or with various hydrocarbon or fatty oils, such as naphtha, toluene, kerosene, mineral lubricating oils, to improve the viscosity index and other properties thereof, greases, paraffin wax, petrolatum, or with sodium, calcium, lithium, or other metal stearate, lead oleate or -naphthenate, zinc stearate, or other soaps, asphalt, polysilicones, etc. or various natural or synthetic waxes, resins and plastics such as carnauba wax, beeswax, shellac, phenol-formaldehyde resin, isobutylene-styrene copolymers, polyacrylic esters, styrene-unsaturated dicarboxylic acid resins, polyvinyl chloride or esters such as acetate, butyrate, or copolymers thereof, high molecular weight and low molecular weight polybutene, natural rubbers and synthetic rubbers such as those of the butadiene-styrene type, butadiene-acrylonitrile type, the low unsaturation type made by polymerizing isobutylene wtih a small amount of diolefin such as isoprene at low temperature, polybutadiene, polyisoprene, polyalloocimene, polymethylpentadiene, as well as olefinic polymers e. g., polystyrene, polypropylene, polyethylene, and various cellulosic derivatives, etc.

The sulfonated and other copolymer derivatives of this invention may be used as processing aids for milling rubber and other plastic materials, and they may be used as mould lubricants, as coatings for various types of solid materials such as metal, wood, stone, concrete, bricks, tile, paper, cloth, etc. They may also be used either as emulsifying agents or as emulsifying assistants in the emulsion polymerization of various diolefin compounds such as butadiene, isoprene, etc. alone or together with other copolymerizable material such as styrene, acrylonitrile etc., or in the emulsion polymerization of olefinic materials such as methyl methacrylate, styrene, various substituted styrenes, as well as vinyl halides, esters, ethers, and other vinyl compounds. These sulfonated stybutenes and other cyclic-aliphatic copolymer derivatives may also be used to stabilize or to assist in stabilizing colloidal dispersions of carbon black or other pigments, or other finely-divided solids in hydrocarbon oils or fatty oils for use in paints, varnishes, lacquers and other coating compositions. The sulfonated or other copolymer derivatives, particularly the low-molecular weight oily ones, may be used as lubricants for textile materials such as virgin wool in weaving and other textile processes, or for other organic or inorganic fibrous materials, e. g., fibers made of glass, high molecular weight polyamides, rayon or cellulose acetate, or as lubricants for cold drawing or extrusion of copper, aluminum or steel or other metal shapes such as wires, cables, tubes, angle bars, etc. These sulfonated stybutanes or other copolymer derivatives made according to this invention, can be used to disperse, or to assist in dispersing finely-divided solids such as carbon black or other fillers in high molecular weight synthetic rubbery materials such as various synthetic rubbers mentioned hereinabove, or such as high molecular weight polybutene, which have excessive "nerve" and are difficult to mix on the conventional rubber mill or in kneader type mixers. These soap type mixtures are of value when a given pH must be obtained in some operations. These organic polymer sulfonates may be dry mixed with polysilicones, $Na_4P_2O_7$, $Na_3PO_4$, sodium silicates and other inorganic salts to obtain modified synthetic detergents and mixtures, or mixed with sodium stearate or other toilet or laundry soap.

Another advantage of the invention is that when the copolymer resins are modified by chemical reactions which result in attaching to the high molecular weight cycli-aliphatic copolymer a polar group, such as a free sulfonic group, the resulting modified resins are especially adapted for use as adhesives for metal, rubber, synthetic rubbers and the like. Conditions of reaction can also be employed which will, in the case of sulfonic acid, for example, result in the formation of the corresponding sulfone.

These sulfonated or phosphated etc. cyclic-aliphatic copolymers may also be compounded in paraffinic or naphthenic or other mineral oils or fatty oils, with other additives such as high molecular weight polybutene, oil-soluble polyacrylic esters such as polylauryl acrylate, sulfurized alkylated phenol, as well as barium or other metal salts of such phenols, other alkylated phenols such as the one made by reacting para-cresol with isobutylene which is believed a 2,6-di-tertiary butyl cresol, organo-silicon polymers, pour depressors such as those made by Friedel-Crafts condensation of chlorinated paraffin wax with naphthalene or phenol, E. P. lubricants such as the one made by reacting chlorinated kerosene or chlorinated paraffin wax with a sulfurizing agent such as sodium polysulfide or sodium xanthate or various other additives such as dyes, graphite etc. The high molecular weight, high styrene type stybutene copolymer sulfonates may be compounded with 5% to 30% of graphite to formulate a solid composition suitable for packings for rotating shafts etc. The modified copolymers of this invention may also be compounded in various synthetic oils, alone or with other additives such as polybutene and others mentioned hereinabove.

The sulfonated and other copolymer derivatives of this invention may if desired, be separated into fractions of different molecular weight or of different degrees of solubility in water, alcohol, or other desired solvents, by partial precipitation from solvent solution or by solvent extraction or by other suitable means.

The products of this invention may be manufactured in various solid or liquid forms either per se or in a concentrated or dilute solvent solution in a suitable volatile or non-volatile liquid medium such as a mineral lubricating oil base stock, linseed oil, a refined kerosene, or naphtha, or in some of the common organic solvents such as alcohol, acetone, ether, or in aqueous solutions. They may be manufactured in a powdered or granular solid state, or in some instances, may be sheeted out into thin, self-supporting films which may be furnished in roll or strip form, or extruded in form of tubes, rods and other shapes.

Chemical analyses indicate that by the sulfonation treatments carried out according to this invention, sulfonated stybutenes have been obtained having as high as 15% of sulfur.

The invention will be better understood from a consideration of the following experimental data:

EXAMPLE 1

A stybutene (styrene-isobutylene copolymer) having a combined styrene content of about 60% and an intrinsic viscosity of 0.68 in toluene, which copolymer was made at about −100° C., by the use of "AlC₃–MeCl" catalyst, was dissolved in 20% by weight concentration in carbon tetrachloride. To 400 ml. of the resulting solution, was slowly added 50 gms. of 100% sulfuric acid. The mixture was heated for two hours at 50° C. After this the excess $H_2SO_4$ was neutralized with $NH_4OH$ applying a slight excess of alkali. The solvent ($CCl_4$) was then removed from the sulfonate by evaporation. A yellow polymer was the resulting product. Some insoluble

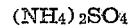

$(NH_4)_2SO_4$ salts were present in the product. Resulting sulfonate was slightly soluble in di-isobutylene, slightly soluble in cold water. The sulfonated copolymer was compatible with the original styrene-isobutylene copolymer.

EXAMPLE 2

The stybutene copolymer sulfonate made as described above in Example 1 was found to have good emulsifying properties. 550 gms. of polybutene having an average molecular weight (Staudinger method) of about 12,000, was mixed in a laboratory kneader with 20 gms. of the stybutene sulfonate made in Example 1, and to this mixture was slowly added 1,000 gms. of water at 40° C. This procedure formulated an emulsion of polybutene in water, which is useful as an adhesive.

EXAMPLE 3

An oil-soluble copolymer sulfonate was formulated by reacting a stybutene having a combined styrene content of about 20% and made at −103° C. with 20% fuming sulfuric acid at 100° C., by slowly adding 50 gms. of the stybutene which had been calendered into a thin film, to 15 gms. of fuming sulfuric acid at 100° C. Excess acid was removed from the resulting sulfonate by the addition of slight excess of $Ba(OH)_2.8H_2O$ in hot octadecyl alcohol to a mineral oil solution of the copolymer sulfonate. The mineral oil used had a viscosity at 210° F. of 57 S. S. U. and a viscosity index of 98. After heating to remove water, the insoluble $BaSO_4$ was removed from the oil solution of polymer sulfate by filtration. The oil-soluble copolymer sulfonate was found to be surface active. This activity was noted by the ability of the polymer sulfonate to disperse carbon black in oil for long periods of time (48 hours at 100° C.). Also, viscosity tests proved that the polymer increased the viscosity index of the oil from 98 to 131 when used in concentrations of 1.5% by weight. Base oil had 98 viscosity index and 57 S. S. U. at 210° F.

EXAMPLE 4

A stybutene having a combined styrene content of about 50% and an intrinsic viscosity of 0.83 was dissolved in 20% concentration in carbon tetrachloride and treated with 1% by weight (based on the stybutene) of 95% sulfuric acid, and the mixture refluxed for ½ hour, after which the carbon tetrachloride was removed by vacuum (27 inches) and the resultant dry modified copolymer (stybutene modified by slight sulfonation) was milled at 180° F. and then sheeted into a thin film, which showed a tensile strength of 1,020 lbs./sq. in., and which was as clear as the original stybutene, but had a less tacky surface texture, thereby showing the improvement effected by the sulfonation treatment.

EXAMPLE 5

A stybutene having a combined styrene content of about 60% and having an average molecular weight of about 4,000, which was made at about −23° C., the boiling point of methyl chloride, was reacted with 10% by weight of chloro sulfonic acid at 50° C., using 5 volumes of carbon tetrachloride per volume of reaction mixture. The resulting stybutene sulfonyl chloride may be represented by the general formula $R(SO_2Cl)_x$ in which R represents a stybutene copolymer molecule and $x$ indicates the number of sulfonyl chloride groups attached to the copolymer molecule. The solvent was recovered from the reaction mixture by vacuum distillation, leaving the stybutene sulfonyl chloride as residue.

EXAMPLE 6

The stybutene sulfonyl chloride made in Example 5 was converted into the corresponding stybutene sulfonamide by using $NH_3$ gas in $CCl_4$ solution as follows: 10 gms. of stybutene sulfonyl chloride was added to 300 ml. of $CCl_4$. To this solution was added $NH_3$ gas at the rate of 2 cu. ft. per hour for 10 hours. After this, the excess $NH_3$ and $CCl_4$ was removed from the sulfonamide by vacuum distillation.

EXAMPLE 7

A stybutene was made by copolymerizing 97% by weight of isobutylene and 3% of styrene in 3 volumes of liquid ethane per volume of active olefin polymerizable feed, using as catalyst 2% of $BF_3$ activated with 0.1% of ethyl ether, the latter being present in the hydrocarbons before adding the catalyst, and the $BF_3$ being added as a gas. The temperature of copolymerization was about −89° C. The resulting copolymer which had a combined styrene content of about 3%, had an average molecular weight of about 50,000 and had a rubberlike, plastic elastic texture.

The above described stybutene copolymer was dissolved in 10% concentration of carbon tetrachloride, and 200 ml. of the resultant stybutene-$CCl_4$ solution was added to 25 ml. of concentrated $H_2SO_4$ in a Pyrex beaker. The resulting solution was heated at the boiling point of the carbon tetrachloride for 20 minutes and then the product, still dissolved in $CCl_4$, was washed with cold water $NaHCO_3$ water solution, and finally the solvent was removed by heating. The resulting product contained 1.8% sulfur and it was an oil-soluble stybutene sulfonate. Tests proved that the polymer was a viscosity index improver for mineral oils. Blending results are given:

| Percent Polymer | S. S. U. at 210° F. | Viscosity Index |
|---|---|---|
| 0 | 43 | 112 |
| 1.2 | 69 | 138 |

EXAMPLE 8

150 ml. of styrene was added to 4 l. of liquid propane. To this styrene-propane liquid feed at about −44° C. was added 1,000 ml. of liquid C. P. propylene. The hydrocarbons were held in a large Dewar flask. To this liquid olefin feed was added 1,000 ml. of an active catalyst solution. (The catalyst was made by dissolving 8 gms. of $AlBr_3$ for 100 ml. of methyl chloride.) This $AlBr_3$ strong catalyst solution was added to the olefin feed at about −40° C. The polymerization reaction was rather slow and after about 15 minutes a liquid polymer was recovered from the Dewar flask. This polymer oil was marked with 3 volumes of isopropyl alcohol, some water, and then dried at 180° F. for 8 hours. Yield of oily polymer was 61.9%. Viscosity of copolymer oil was 73 S. S. U. at 210° F.

"Propylene-styrene" copolymer oil (52.0 gms.) was then added to 500 ml. of $CCl_4$. To this clear solution was added 30 ml. of concentrated $H_2SO_4$ (98%) and the mixture was heated under reflux conditions for 1 hour at about the boiling point of the $CCl_4$. After this reaction, the solvent, $CCl_4$ was removed by vacuum distillation, and the residue was washed at room temperature with several volumes of cold acetone, to remove unreacted acid, etc. Yield of sulfonate was about 100%. The dry sulfonated product was then tested by the E. Gray King method (see The Journal of Physical Chemistry, vol. 48, No. 3, pages 141 to 154) for its foam formation property in organic liquids. To determine the foaming tendency, or surface-active property, 10 to 15 cc. of the 5% sulfonated copolymer solution was shaken in a glass-stoppered 100 ml. graduate. The foams produced were so transitory that the time of expiration of the foam produced on the surface of the solution was taken as a measure of its foaming capacity and stability. This observation was apparently unaffected by the volume of liquid or the violence of the agitation. Results are recorded in the following table:

*Foaming tendency of a 5% concentration as indicated by time of expiration in seconds*

|  | Solvent—Benzene | Solvent—Ethyl-propyl ketone |
|---|---|---|
|  | Seconds | Seconds |
| Sulfonated-propylene-styrene copolymer | 80 | 26 |
| Low mol. wt. organosilicon polymer $\begin{bmatrix} & CH_3 & CH_3 & CH_3 & CH_3 \\ O-Si-O-Si-O-Si-O-Si-O \\ & CH_3 & CH_3 & CH_3 & CH_3 \end{bmatrix}_2$ | 25 |  |
| Sulfonated-propylene-styrene copolymer 4.2% + 0.8% organosilicon polymer | 96 |  |

It is to be noted that the sulfonated copolymer is an active foaming agent in some organic liquids, such as benzene and to some extent also ethyl propyl ketone, and that replacing part of the sulfonated copolymer with a small amount of organisilicon polymer, which by itself is a good foaming agent in benzene, but has no effect in ethyl propyl ketone, the mixture is a better foaming agent for benzene, but has no foaming tendencies in ethyl propyl ketone.

EXAMPLE 9

A stybutene having a combined styrene content of about 10%, which had been made at a temperature of about −23° C. was sulfonated. 0.5 gm. of the resulting stybutene copolymer sulfonate, which had good emulsifying properties, was added to a mixture of 200 ml. of water and 250 ml. of methyl methacrylate, and the emulsified mixture was refluxed at 75° C. with 0.5 ml. of hydrogen peroxide as polymerization catalyst, for a period of about 60 minutes. The resulting product was found to be a stable emulsion of polymethyl methacrylate in water.

EXAMPLE 10

A stybutene having a combined styrene content of 50% and made at about −103° C., was sulfonated, and 2 parts by weight of the resulting stybutene sulfonate were mixed into 100 parts by weight of polybutene having an average molecular weight of about 100,000, and then 300 parts by weight of carbon black were gradually added until thoroughly mixed. Such high molecular weight polybutene per se has such high "nerve" that it mixes with difficulty with fine powdered material such as carbon black, but the small addition of stybutene copolymer sulfonate served as a very efficient processing aid, and facilitated the dispersion of the carbon black in the polybutene.

EXAMPLE 11

About 50 gms. of a stybutene made at −103° C. with a combined styrene content of about 60%, was dissolved in 300 ml. of carbon tetrachloride, and was mixed with 50 ml. of 99% to 100% $H_2SO_4$ at about 40° C. to 50° C. for one hour. Excess $H_2SO_4$ was neutralized with a slight excess of sodium carbonate, and the resulting sodium copolymer sulfonate solution in carbon tetrachloride was washed three times with 50% isopropyl alcohol, all of the washings being collected and washed with petroleum ether to remove residual carbon tetrachloride. The oil-free solution was then treated with a small amount of anhydrous sodium carbonate to remove water from the alcohol. The upper layer was siphoned off and filtered through paper, and isopropyl alcohol was stripped off from the filtrate by evaporation on a hot plate, leaving as residue a yellow salt which was a sodium stybutene copolymer sulfonate. This product is soluble in water and only partially soluble in light hydrocarbon liquids such as di-isobutylene; it may be used as wetting agent and emulsifier.

The washing of the carbon tetrachloride solution of sulfonated copolymer with isopropyl alcohol precipitated a small amount of a rubber-like polymer which proved to be a small amount of polyisobutylene which had not actually copolymerized with styrene during the original preparation of the stybutene copolymer.

EXAMPLE 12

Example 11 was repeated except that the acid used for the sulfonation was 25 ml. of fuming sulfuric acid (20% excess $SO_3$), and the reaction time was ½ hour at room temperature. A brown gel was formed almost immediately upon contact of the acid with the polymer-carbon-tetrachloride solution. A further addition of fine ml. of acid formed more sulfonates. The stybutene sulfonates were removed by decanting the free acid and carbon tetrachloride solution. Most of the gel was found to be soluble in 99% isopropyl alcohol, removing the insoluble portion by paper filtration. The excess sulfuric acid was neutralized with $Na_2CO_3$. The alcohol was removed by stripping on the hot plate, accelerating the removal of vapors by passing a stream of nitrogen over the solution. The residue, a brown, viscous material, is completely soluble in cold water, forming a considerable amount of stable foam upon shaking. This product was found to be insoluble in di-isobutylene and in benzol, and contained 15.14% S.

EXAMPLE 13

Example 12 was repeated except that the stybutene used was made at −23° C. and was a brittle type resin instead of the high molecular weight, tough, flexible type plastic which results from copolymerization at −103° C. 50 gms. of the brittle stybutene was dissolved in 300 ml. $CCl_4$ and treated with 10 ml. of fuming $H_2SO_4$ (20% excess $SO_3$). An insoluble gel sulfonate is formed immediately on contact of the acid. The $CCl_4$ solution was decanted and the gel taken up in isopropyl alcohol, and neutralized with anhydrous sodium carbonate. The alcohol and water was removed by heating on the hot plate, passing a stream of $N_2$ to remove vapors.

The product is a thick, brown, viscous gel, soluble in cold water, giving a heavy foam on shaking. It is insoluble in di-isobutylene, benzol, and in $CCl_4$, but soluble in water, however all attempts to neutralize in aqueous solution formed a heavy, stable emulsion. It was much easier and quicker to carry out this step in an alcohol or alcohol-water solution using anhydrous $Na_2CO_3$. The product contained 13.87% S.

EXAMPLE 14

A stybutene having a combined styrene content of about 10% and having an average molecular weight of about 8,000 was sulfonated, and 0.5% by weight of the resulting sulfonated copolymer was blended in a paraffinic lubricating oil base stock having a viscosity of about 43 seconds Saybolt at 210° F., and a viscosity index of about 112, together with 1% by weight of polylauryl acrylate, and the resulting blend was found to have a viscosity of 59 seconds Saybolt at 210° F. and a viscosity index of 144.

The invention may not only be applied to the various copolymers per se which were described above, but also to various organic derivatives thereof, such as may be made by alkylating or acylating said copolymers, e. g., by reacting them respectively with amyl chloride or other alkylating agents, or stearyl chloride or other acylating agent, or by condensing them with polyhalogenated aliphatic compounds such as ethylene dichloride, chlorinated wax containing at least a substantial proportion of dichlorwax molecules, or other treating agents intended to modify the solubility, molecular weight or other properties of the copolymer, without eliminating their susceptibility to reaction with sulfuric acid, phosphoric acid or other polybasic acid treating agent according to this invention.

It is not intended that this invention be limited to the specific examples which have been given merely for the sake of illustration, but only by the appended claims in which it is intended to claim all novelty inherent in the invention, as well as all modifications coming within the scope and spirit of the invention.

What is claimed is:

1. Process which comprises reacting a copolymer, having a molecular weight of at least 2,000 and an iodine number less than 10, of 3–60% by weight of styrene and 97–40% of an aliphatic mono-olefin of 3 to 5 carbon atoms, with a treating agent consisting of sulfuric acid of 95–120% concentration, at 20°–100° C. for ⅓ hour to 2 hours, to make sulfonic acids of said high molecular weight styrene-olefin copolymer.

2. Process which consists essentially in reacting a styrene-isobutylene copolymer having a molecular weight of about 4,000–50,000 and an iodine number less than 10, and having a combined styrene content of about 3 to 60%, with a treating agent consisting of sulfuric acid of 95–120% concentration, at 20°–100° C., for ⅓ hour to 2 hours, to make sulfonic acids of said high molecular weight styrene-isobutylene copolymer.

3. Process according to claim 2 in which the copolymer contains 3 to 30% combined styrene, and is treated with fuming sulfuric acid.

4. Product comprising essentially a sulfonic acid of a copolymer, having a molecular weight of at least 2,000 and an iodine number less than 10, of 3–60% by weight of styrene and 97–40% of an aliphatic mono-olefin of 3 to 5 carbon atoms.

5. Product consisting essentially of a sulfonate of a styrene-isobutylene copolymer, having a molecular weight of about 4,000–50,000 and an iodine number less than 10, and having a combined styrene content of about 3 to 60%, said sulfonate having a sulfur content in the range of 1.8 to 15.4%, being at least partially water-soluble, and having emulsifying properties.

6. Product consisting essentially of a substantially neutral barium sulfonate of a styrene-isobutylene copolymer, having a molecular weight of about 4,000 to 50,000 and an iodine number less than 10, and having a combined styrene content of about 20%, said copolymer sulfonate having surface active properties and viscosity index improving properties, and being substantially soluble in mineral lubricating oil, said copolymer sulfonate having been made by reacting 50 parts by wt. of the high molecular weight styrene-isobutylene copolymer with 15 parts by wt. of fuming sulfuric acid at 100° C., and neutralizing with barium hydroxide.

7. A composition comprising a major proportion of a non-volatile liquid to solid hydrocarbon material, containing dissolved therein a surface active agent consisting essentially of a sulfonic acid of a copolymer, having a molecular wt. of at least 2,000 and iodine number less than 10, of 3–60 per cent by wt. of styrene and 97–40 per cent of an aliphatic mono-olefin of 3 to 5 carbon atoms, said copolymer sulfonic acid having a sulfur content in the range of 1.8 to 15.4 per cent.

8. A composition consisting essentially of a major proportion of mineral lubricating oil having dissolved therein a viscosity index improving amount of about 0.5 to 1.5% of an oil-soluble barium sulfonate of a styrene-isobutylene copolymer having a molecular wt. of about 4,000 to 50,000 and iodine number less than 10, and having a combined styrene content of 20%.

9. A substantially stable emulsion comprising a major proportion of water, having dispersed therein a minor proportion of a high molecular wt. synthetic hydrocarbon polymer, and an emulsifying agent consisting essentially of a sulfonate of a styrene-isobutylene copolymer, having a molecular wt. of about 4,000 to 50,000 and an iodine number less than 10, and having a combined styrene content of about 3 to 60%, said sulfonate having a sulfur content in the range of 1.8 to 15.4% and being at least partially water-soluble.

10. Product according to claim 4 at least partially neutralized with a monovalent basic radical selected from the group consisting of alkali metals, ammonium, and onium bases.

11. Product comprising essentially an ammonium sulfonate of a styrene-isobutylene copolymer having an intrinsic viscosity of about 0.68 and having a combined styrene content of about 60%, said ammonium copolymer sulfonate being slightly soluble in diisobutylene, slightly soluble in cold water, and compatible with a styrene-isobutylene copolymer of the same type of which said sulfonate was derived.

12. Product comprising essentially a sodium sulfonate of a copolymer having a molecular weight of at least 2,000 and an iodine number less than 10, of 3–60% by weight of styrene and 97–40% of isobutylene.

13. Product comprising essentially a sodium sulfonate of a styrene-isobutylene copolymer having an intrinsic viscosity of at least 0.5 and having about 60% combined styrene, said sodium copolymer sulfonate having a sulfur content of about 15.14%, and being completely soluble in cold water.

DAVID W. YOUNG.
WILLIAM H. SMYERS.
WILLIAM J. SPARKS.

References Cited in the file of this patent

UNITED STATES PATENTS

| Number | Name | Date |
|---|---|---|
| 2,201,544 | Marvel | May 21, 1940 |
| 2,209,169 | Mikeska | July 23, 1940 |
| 2,216,257 | Vogt et al. | Oct. 1, 1940 |
| 2,241,900 | Brubaker | May 13, 1941 |
| 2,274,749 | Swyers | Mar. 3, 1942 |
| 2,331,005 | Story | Oct. 6, 1943 |
| 2,340,035 | Zimmer | Jan. 25, 1944 |
| 2,366,007 | D'Alelio | Dec. 26, 1944 |
| 2,400,720 | Staudinger et al. | May 21, 1946 |
| 2,405,971 | McAlevy | Aug. 20, 1946 |
| 2,412,855 | Auten | Dec. 17, 1946 |
| 2,416,061 | McAlevy | Feb. 18, 1947 |